2 Sheets--Sheet 1.

A. H. TAIT & J. W. AVIS.

Improvement in Apparatus for Distilling Petroleum and other Hydrocarbons.

No. 4,367. Reissued May 2, 1871.

Witnesses:
N. X. Ellsworth
H. C. Rawlings

Inventors.
A. H. Tait
Joseph W. Avis

2 Sheets--Sheet 2,

A. H. TAIT & J. W. AVIS.

Improvement in Apparatus for Distilling Petroleum and other Hydrocarbons

No. 4,367

Reissued May 2, 1871.

*Witnesses:*

N. W. Ellsworth

A. E. Rawlings

*Inventor:*

A. H. Tait

Joseph W. Avis

United States Patent Office.

AUGUSTUS H. TAIT AND JOSEPH W. AVIS, OF NEW YORK, N. Y., ASSIGNORS, BY MESNE ASSIGNMENTS, TO CHARLES PRATT, OF SAME PLACE.

Letters Patent No. 63,115, dated March 19, 1867; reissue No. 4,367, dated May 2, 1871.

IMPROVEMENT IN APPARATUS FOR DISTILLING PETROLEUM AND OTHER HYDROCARBONS

The Schedule referred to in these Letters Patent and making part of the same.

*To all whom it may concern:*

Be it known that we, AUGUSTUS H. TAIT and JOSEPH W. AVIS, both of the city, county, and State of New York, have invented a new and improved Apparatus for Distilling Petroleum and other Hydrocarbon Liquids; and we hereby declare that the following is a full and exact description of the same, which will enable those skilled in the art to make and use the same, reference being had to the accompanying drawing forming a part of this specification, in which—

Figure 2:
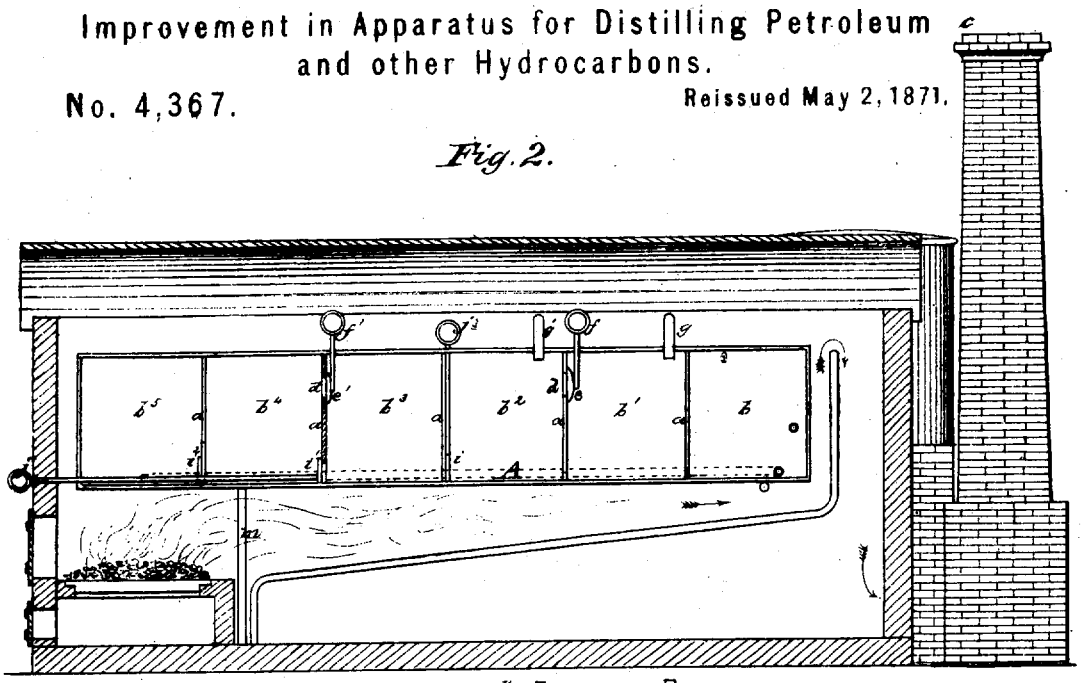
Figure 1:
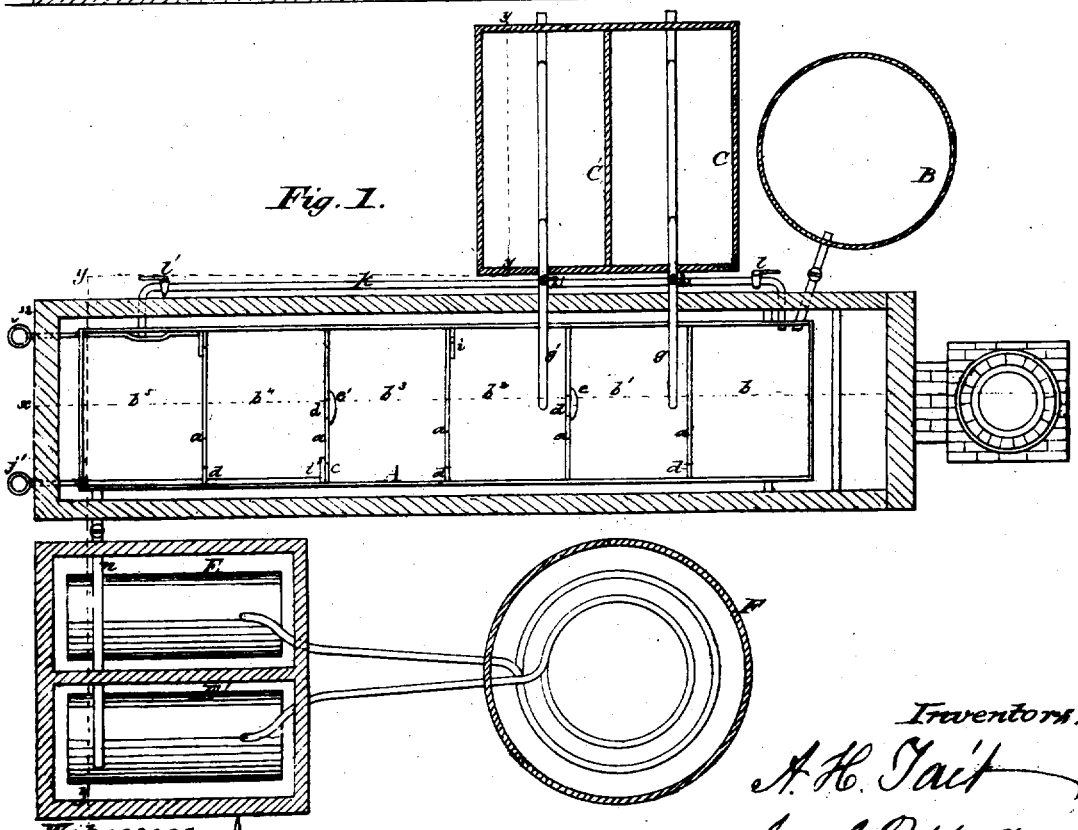
Figure 5:
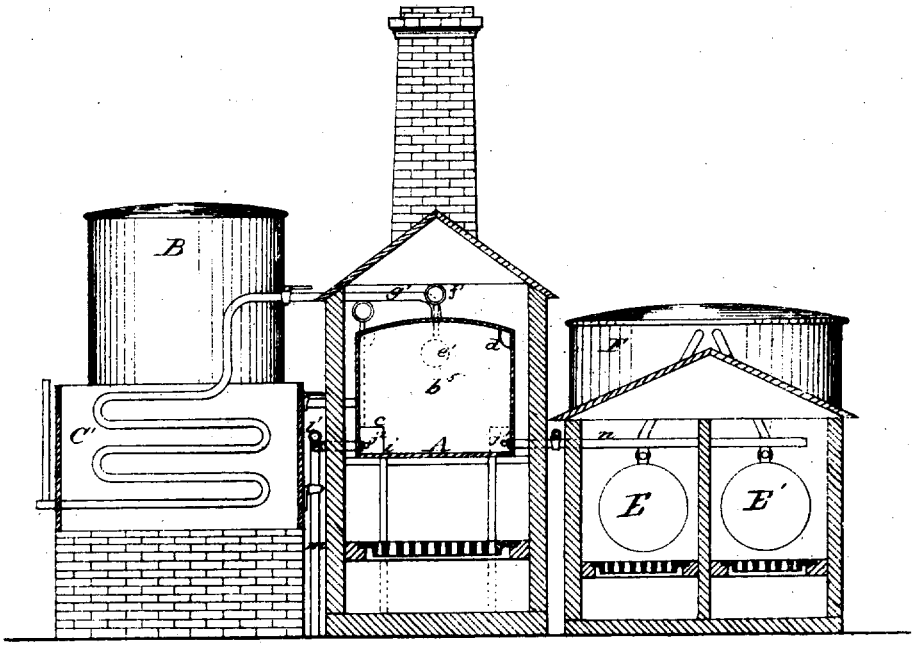

Figure 1 represents a plan or top view of this invention, partly in section;

Figure 2, a longitudinal vertical section of the same, the line *x x*, fig. 1, indicating the plane of section; and Figure 3, a transverse vertical section of the same taken in the plane indicated by the line *y y*, fig. 1.

Similar letters of reference in these views indicate corresponding parts.

The invention consists of an apparatus for distilling petroleum in a continuous manner and separating in different condensers the products according to their specific gravity or temperature of vaporization, and consists of a still composed of several compartments or divisions, arranged together with an opening from one apartment to another at the bottom, so that the petroleum, as it flows from one still to another, kept at the proper temperature, has its products removed; and also with openings from one apartment to another at the top, so that the vapors from any number of apartments may be run off to the same condenser, or to different condensers, at pleasure. Both the bottom and top openings are closed by suitable valves or gates.

Combined with the main still are two or more tar-stills, into which the residuum is placed to complete the distillation, so as not to coke or burn the main still. A separate condenser is attached to the tar-stills.

As it is sometimes desired to pass the oil from one of the cooler apartments or stills to one of the hotter without passing through the intermediate apartments, a pipe is arranged so as to flow the oil around any one or more of the separate stills or apartments. This will enable any one of the apartments to be detached for cleaning or repairing, that apartment being then out of connection.

A represents a still, which may be made in the form shown in the drawing, or in any other suitable form or shape.

This still is divided by one or more partitions, *a*, into two or more compartments, $b\ b^1\ b^2\ b^3\ b^4\ b^5$.

The crude oil is admitted from the supply-tank B to the first compartment *b* which is furthest from the fire-place, and it passes from this compartment to the succeeding compartments through apertures *c* in the lower part of the partitions *a*, which apertures are so situated that the oil is compelled to run through the still in a zigzag course.

In the upper part of the partitions *a* are openings, *d*, for the passage of the vapors which rise from the liquid in the various compartments, and one or more of these openings are provided with valves *e e'*, so that they can be shut off and the course of the vapors can be regulated.

Said valves are operated by handles *f f'* on the top of the still.

From the compartments $b^1\ b^2$ rise pipes *g g'*, provided with stop-cocks *h h'*, and each of these pipes connect with the coil or worm in one of the condensers C or C'.

If the valve *e* is closed the vapors rising from the liquid in the two first compartments *b* and $b^1$ pass through the condenser C, and the vapors arising from the liquid in the compartments $b^2$, $b^3$, $b^4$, and $b^5$ through the condenser C.

But if the valve *e* is opened and the valve *e'* closed the vapors rising from the liquid in the compartments $b\ b^1\ b^2\ b^3$ can be made to pass through either of the condensers by adjusting the stop-cocks *h* and *h'*.

The apertures *c* in the last three partitions *a*, which are situated between the compartments $b^3\ b^3$, $b^3\ b^4$, and $b^4\ b^5$, are provided with gates $i\ i^1\ i^2$, which are operated either from the end or from the side of the still by suitable handles $j\ j^1\ j^2$. By closing the gate *i* the liquid is prevented from passing into the compartments $b^3\ b^4\ b^5$, which are situated nearest to the fire; and these compartments can be readily cleaned without interrupting the operation of the remaining compartments; and by closing the gate $i^1$ the last two compartments, $b^4\ b^5$, can be cleaned without interfering with any of the other compartments; and if it is desired to clean the last compartment, $b^5$, alone, the gate $i^2$ is closed.

The compartment $b^5$ is brought in direct communication with the compartment *b* by means of a pipe, *k*, situated on the outside of the still. This pipe is provided with suitable stop-cocks *l l'*, and it connects with the discharge-pipe *m*. By means of said pipe the liquid from the first compartment can be run directly into the last compartment, and the gravity of the vapors obtained from the liquids in these compartments, and also in the remaining compartments, can be regulated and equalized.

The compartment $b^5$ communicates, through a pipe, *n*, with the coking-retorts E E', which are situated over a separate fire-place. In these retorts the heavy parts or refuse of the liquid undergo a final distillation, and these retorts are so arranged that either of them can be shut off and cleaned out without interfering with the operation of the other.

The vapors rising from the liquid in the coking-retorts are collected in the condenser F.

By this apparatus petroleum or other liquids of a similar nature can be distilled without interruption, the still being so arranged that the same is not liable to choke up; and by combining two or more condensers with the several compartments of the still oil of different specific gravities can be run simultaneously, and the density of these liquids can be regulated by adjusting the valves *e e'*.

What we claim as new, and desire to secure by Letters Patent, is—

1. The compound still herein described, arranged in divisions, compartments, or separate stills, so that oil of different gravity may be taken from different parts, as described.

2. The combination of still A, tar-stills E E', and condenser F, arranged so as to operate substantially as set forth.

3. The combination of two or more condensers with a divided or multiple still, substantially as set forth.

4. The arrangement of gates or valves at the top and bottom of separate stills or compartments, so that any two or more may be made to operate as one or several stills, as set forth.

5. The pipe *k*, arranged so as to distribute oil from still *b* to the other stills, as set forth.

6. The still A, having partitions *a* with apertures *c* and *d*, arranged and combined as set forth.

This specification signed by us this 11th day of April, 1871.

A. H. TAIT.
JOSEPH W. AVIS.

Witnesses:
W. HAUFF,
JNO. D. PATTEN.